United States Patent [19]

Mott

[11] 4,201,336

[45] May 6, 1980

[54] FLUIDIC SQUARE ROOT EXTRACTOR

[75] Inventor: Richard C. Mott, Harwood Heights, Ill.

[73] Assignee: Honeywell Inc., Minneapolis, Minn.

[21] Appl. No.: 950,335

[22] Filed: Oct. 11, 1978

Related U.S. Application Data

[63] Continuation-in-part of Ser. No. 729,511, Oct. 4, 1976, abandoned.

[51] Int. Cl.[2] ........................ G06M 1/12; G05D 15/00

[52] U.S. Cl. ................................ 235/200 WB; 137/85

[58] Field of Search ......... 235/200 R, 200 WB, 61 R, 235/61 A; 137/85, 86

[56] References Cited

U.S. PATENT DOCUMENTS

| | | | |
|---|---|---|---|
| 2,487,310 | 11/1949 | Chandler | 74/522 |
| 2,672,151 | 3/1954 | Newbold | 137/86 |
| 2,736,199 | 2/1956 | Ibbott | 73/205 |
| 2,755,668 | 7/1956 | Meyer | 73/407 |
| 2,800,136 | 7/1957 | Bowditch | 137/85 |
| 2,936,430 | 6/1960 | Westbury | 235/200 R |
| 2,953,148 | 9/1960 | Langford et al. | 235/200 R |
| 2,957,622 | 10/1960 | Hulley | 235/200 R |
| 2,960,098 | 11/1960 | Watrous | 137/85 |
| 2,972,443 | 2/1961 | Watrous | 235/61 R |
| 2,992,559 | 7/1961 | Martz et al. | 235/200 WB |
| 3,072,326 | 1/1963 | Rohmann et al. | 235/200 WB |
| 3,079,074 | 2/1963 | Jordan | 235/61 R |
| 3,159,343 | 12/1964 | Hudson | 235/200 WB |
| 3,165,262 | 1/1965 | Ollivier | 235/200 WB |
| 3,348,771 | 10/1967 | Krayer | 235/200 WB |
| 3,371,862 | 3/1968 | Bowditch et al. | 235/200 WB |

*Primary Examiner*—Stephen J. Tomsky
*Attorney, Agent, or Firm*—Trevor B. Joike

[57] ABSTRACT

A fluidic square root extractor is disclosed having an amplifier for generating an output in response to an input signal the square root of which is to be extracted, and a squaring means for squaring the output signal and applying it as said feedback signal to the amplifier.

31 Claims, 8 Drawing Figures

FLUIDIC SQUARE ROOT EXTRACTOR

This application is a continution-in-part of U.S. Ser. No. 729,511 filed Oct. 4, 1976, now abandoned.

BACKGROUND OF THE INVENTION

The invention relates to devices for taking the square root of an input signal and, more particularly, to devices for providing an output pressure which is a function of the square root of an input pressure.

Current interest in energy conservation and variable volume control systems has given rise to a renewed interest in flow measurement and control. One of the simplest methods to measure the flow within a conduit or duct is to measure the pressure drop that occurs across an orifice, baffle or coil. The drawback of this approach, however, is that the output signal from this measuring device is a square root function since flow and pressure drop are related to one another by a square root function. For low flows, the pressure drop changes slowly, but for large flows the pressure drop changes rapidly. To overcome this problem, it has been traditional to use a square root extractor to provide a signal which is the square root of the output signal from the pressure measuring device and is, thus, substantially linear. The present square root extractors, however, are expensive and complex.

These prior art square root extractors specifically fall into several categories. First, there are those which use the input pressure supplied thereto for adjusting a fulcrum to mechanically extract square roots. Second, there are those which rely on the multiplication of forces acting on a balance beam.

SUMMARY OF THE INVENTION

None of the prior art systems, however, provide the simple multiplier or squaring and amplifier arrangement of the instant invention. The instant invention involves the use of an amplifier, responsive to both an input pressure the square root of which is to be extracted and a feedback signal, for producing an output signal and a squaring means or multiplier which squares the output signal and applies the squared output signal as the feedback signal to the amplifier. Therefore, the output pressure is, indeed, a function of the square root of the input pressure.

BRIEF DESCRIPTION OF THE DRAWINGS

These and other features and advantages will become apparent from a detailed consideration of the invention taken in conjunction with the drawings in which.

DETAILED DESCRIPTION OF THE INVENTION

Figure 1:
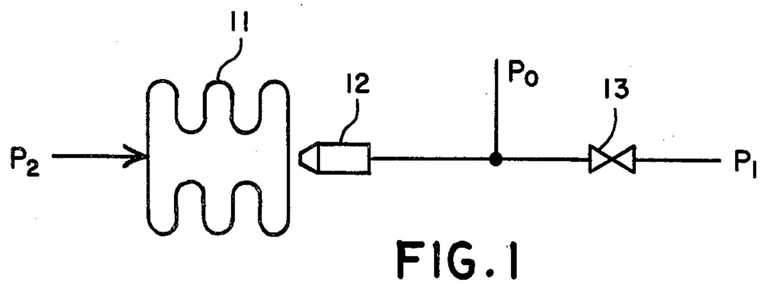
FIG. 1 is a schematic diagram of one form of a squaring or multiplying device.

In FIG. 1, a multiplying device is shown having a motor device or bellows 11, for receiving a pressure from a source of pressure P2, and a nozzle 12. The nozzle 12 is connected through a restriction 13 to a source of pressure P1 and a junction between nozzle 12 and restriction 13 is connected to an output pressure line P0. The output pressure P0 is proportional to the product of P1 and P2. This can be seen by assuming that P2 is sufficiently large to close off nozzle 12; the P0 directly follows the changes of P1. If P1 is held constant, then P0 directly follows the changes of P2. Thus, $P0=(K)(P1)(P2)$, where K is proportionality constant. If P1 is equal to P2, then the output pressue P0 is a function of the square of the pressure P1.

Figure 3:
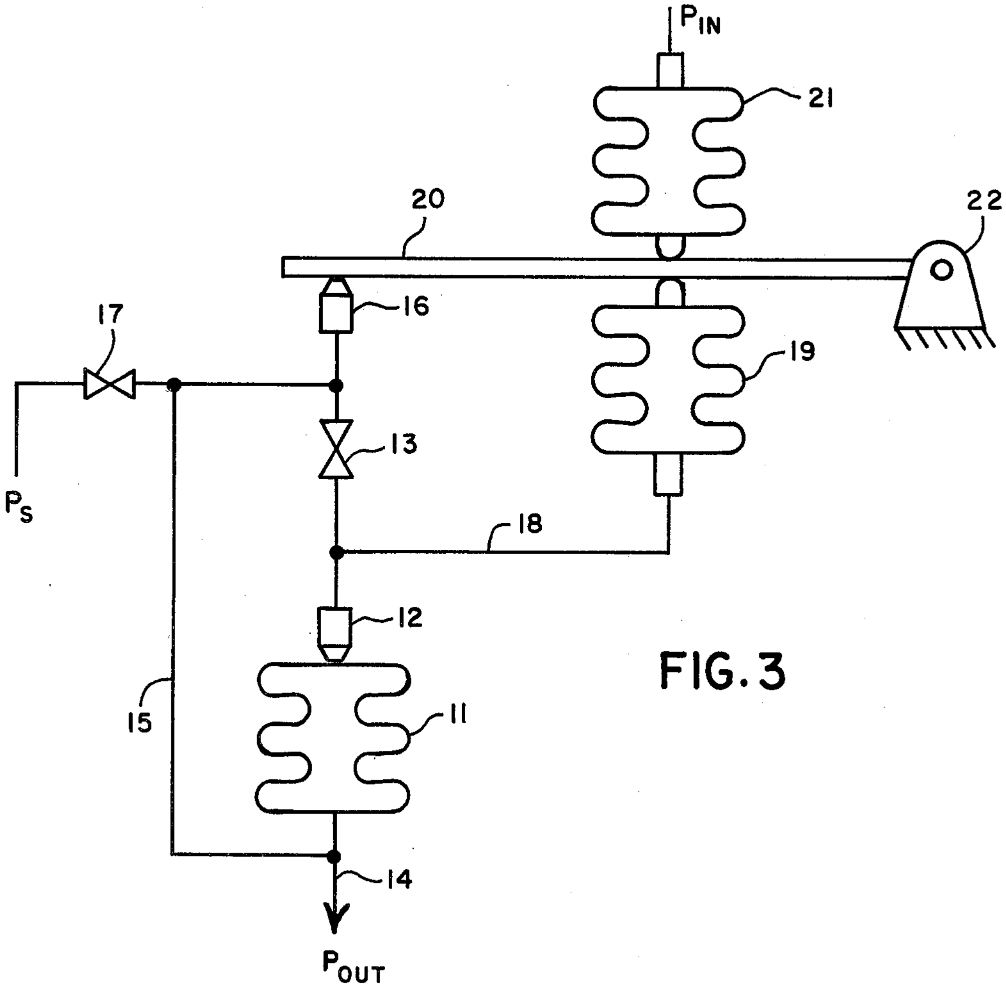
FIG. 3 is a schematic diagram of a square root extractor using the squaring device of FIG. 1.

The multiplying device of FIG. 1 is arranged as the squaring device in FIG. 3 in a system to obtain the square root of an input pressure. The bellows 11 is connected to an output line 14 and output line 14 is connected by line 15 through restriction 13 to nozzle 12. Line 14 is also connected by line 15 to nozzle 16 and to a source of main line pressure through restriction 17. A feedback line 18 is connected from the junction of restriction 13 and nozzle 12 to a feedback motor device or bellows 19. The output pressure in line 14 is determined by the distance between the force transmitter or lever 20 and the nozzle 16. This pressure is applied to the bellows 11 and through restriction 13 to the nozzle 12. Thus, as described with respect to FIG. 1, the pressure in line 18 is a function of the square of the output pressure in line 14. This feedback pressure is applied to the feedback means, motor means or bellows 19 to apply a feedback force to the transmitter or lever 20. An input pressure P(in) is applied to a motor means or bellows 21 for applying a force to the transmitter or lever 20 which is a function of the input pressure P(in) the square root of which is to be extracted. The lever 20 is pivoted at 22.

The bellows 19 and 21 and lever 20 act as a variable gain amplifier where the gain is adjusted by the feedback pressure. The gain is determined by the square of the output pressure and, in cooperation with the input pressure applied to the bellows 21, insures that the output pressure is the square root of the input pressure P(in).

Figure 4:
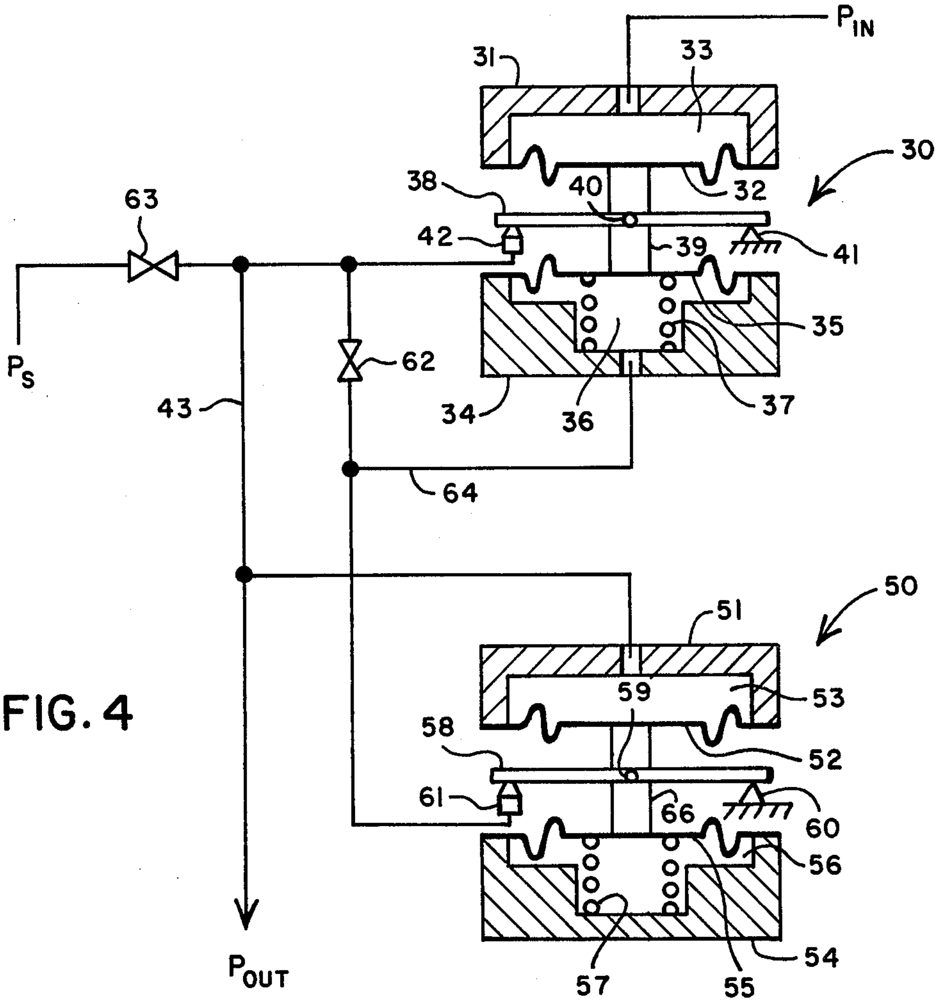
FIG. 4 is a schematic diagram of an alternative square root extractor.

In FIG. 4, which shows an alternative form for a square root extractor, an amplifying device is generally shown at 30 and a squaring device is generally shown at 50. The amplifying device 30 has a diaphragm module 31 with a diaphragm 32 defining a control chamber 33. The control chamber 33 is connected to the input pressure P(in) the square root of which is to be extracted. The feedback means is comprised of a diaphragm module 34 having a diaphragm 35 for defining a control chamber 36. Within the control chamber 36 is a spring 37 for applying a bias force against the diaphragm 35. A force transmitter or lever 38 is connected to both the diaphragms 32 and 35 through a linkage 39 at a point 40 which lever pivots about a fixed pivot point 41. The transmitter or lever 38 cooperates with a nozzle 42 to supply an output pressure to a first connector or pneumatic line 43 connected to supply an output pressure P(out).

The squaring device 50 has a diaphragm module 51 with a diaphragm 52 defining a control chamber 53. The control chamber 53 is connected to the output line 43. A second diaphragm module 54 has a diaphragm 55 for defining a control chamber 56 within which is a spring 57 for applying a bias force to diaphragm 55. A lever 58 is operatively connected to the diaphragms 52 and 55 through a linkage 66 at a point 59 and the lever pivots about a fixed pivot point 60. The lever 58 cooperates with a nozzle 61 which is connected through line 64 to the feedback chamber 36. Line 64 is connected to nozzle 42 through restriction 62 and to the main supply source through restrictions 62 and 63. Line 43 is connected to the main supply source through restriction 63.

The squaring device 50 is connected essentially in the same manner as the squaring device shown in FIG. 3, i.e. to square P(out). Output pressure is applied to the control chamber 53 from the output line 43 and is also applied to the nozzle 61 through the restriction 62. The output or feedback pressure from the squaring device taken on line 64 is thus a function of the square of the output pressure and is supplied to the feedback means or control chamber 36 of the diaphragm module 34. This feedback pressure acts against the diaphragm 35 to apply a force to the transmitter 38 relating to the feedback pressure. The input pressure within chamber 33 applies a force to the force transmitter or lever 38. The position of lever 38 with respect to nozzle 42 controls the output pressure P(out) in line 43. As can be seen, therefore, the output pressure is a function of the square root of the input pressure. Again, the feedback pressure which is the square of the output is used to adjust the gain of the amplifier 30 according to any changes in the output signal which result from corresponding changes in input pressure P(in).

Figure 2:
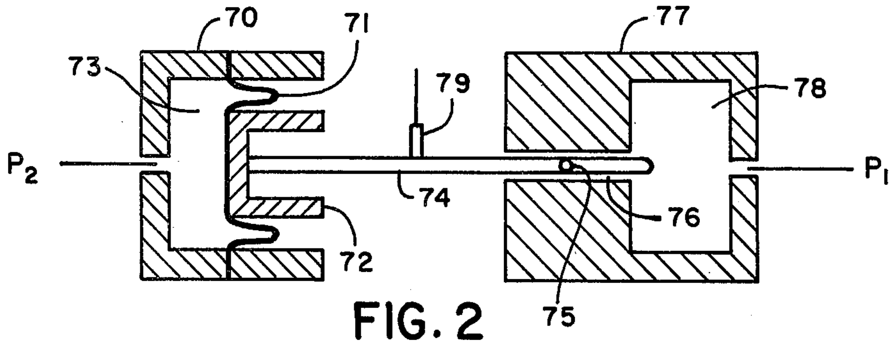
FIG. 2 is a schematic diagram of another form of a squaring or multiplying device.

FIG. 2 shows another form of a multiplying device which has a motor or actuator comprising a diaphragm module or unit 70 having a diaphragm 71 and a cup-shaped member 72 attached thereto. The diaphragm 71 defines a control chamber 73 which receives a pressure P2. The cup serves to control the position of a tube 74 which has an aperture 75 therein. The position of the aperture 75 is, therefore, varied within a channel 76, defined by a module unit 77, by the pressure within the control chamber 73. Pressure P1 is supplied to a chamber 78 within the module 77 and establishes a pressure gradient along the channel 76 extending from chamber 78 to atmosphere. The position of the aperture 75 within the channel 76 will determine the pressure along the pressure gradient established within channel 76 which pressure is transmitted from the aperture 75 to the output nozzle 79 of tube 74 which supplies the output pressure P0. As in the case of FIG. 1, it can be shown that the output pressure P0 is proportional to the product of P1 and P2. If the lines for the pressures P1 and P2 are connected together such that the pressure P1 equals the pressure P2, the output pressure is a function of the square of the pressure P1.

Figure 5:
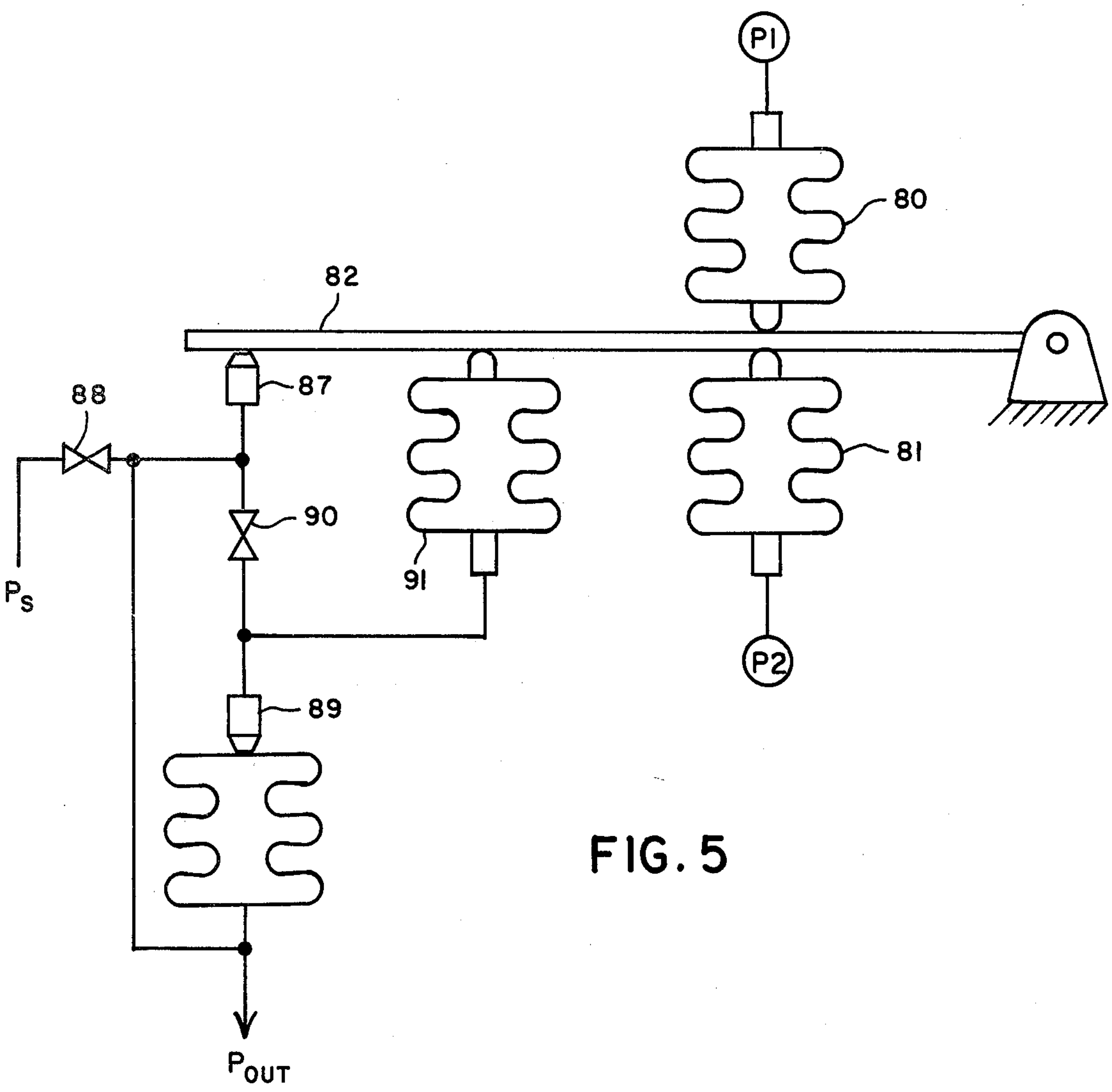
FIG. 5 is a schematic diagram of another form of square root extractor for use with two inputs.

The apparatus of FIG. 5 can be used for measuring the velocity of air moving through a duct. Bellows 80, acting on one side of lever 82, is connected to a first pressure source P1 and bellows 81, acting on the other side of lever 82 oppositely to bellows 80, is connected to a source P2. Sources P1 and P2 may be the Pitot tube arrangement shown in FIG. 6. Tube 83 is pointed upstream of the air moving through duct 85 under the control of damper 86 and provides pressure P1 which is the sum of the velocity pressure of this air and the static pressure of this air. Tube 84 is arranged to provide pressure P2 which is a function of the static pressure of the air in duct 85.

Lever 82 subtracts the pressure P2 exerted on it by bellows 81(the static pressure) from the pressure P1 exerted by bellows 80(velocity pressure+static pressure) to yield velocity pressure. Velocity pressure is nonlinear, closely approximating a square function. By the square root of the difference in pressure between P1 and P2, a signal is produced bearing a substantially linear relationship to the flow or velocity of the air moving through duct 85.

The difference between pressures P1 and P2 controls the position of lever 82 with respect to nozzle 87 in turn controlling the pressure within nozzle 87. Nozzle 87 is connected to a main supply of pressure PS through restriction 88 and to P(out) and to nozzle 89 through restriction 90. The pressure P(out), acting through bellows 91 determines the feedback pressure supplied to feedback bellows 91. The resulting output pressure P(out) is a function of the square root of the difference between pressures P1 and P2.

Figure 7:
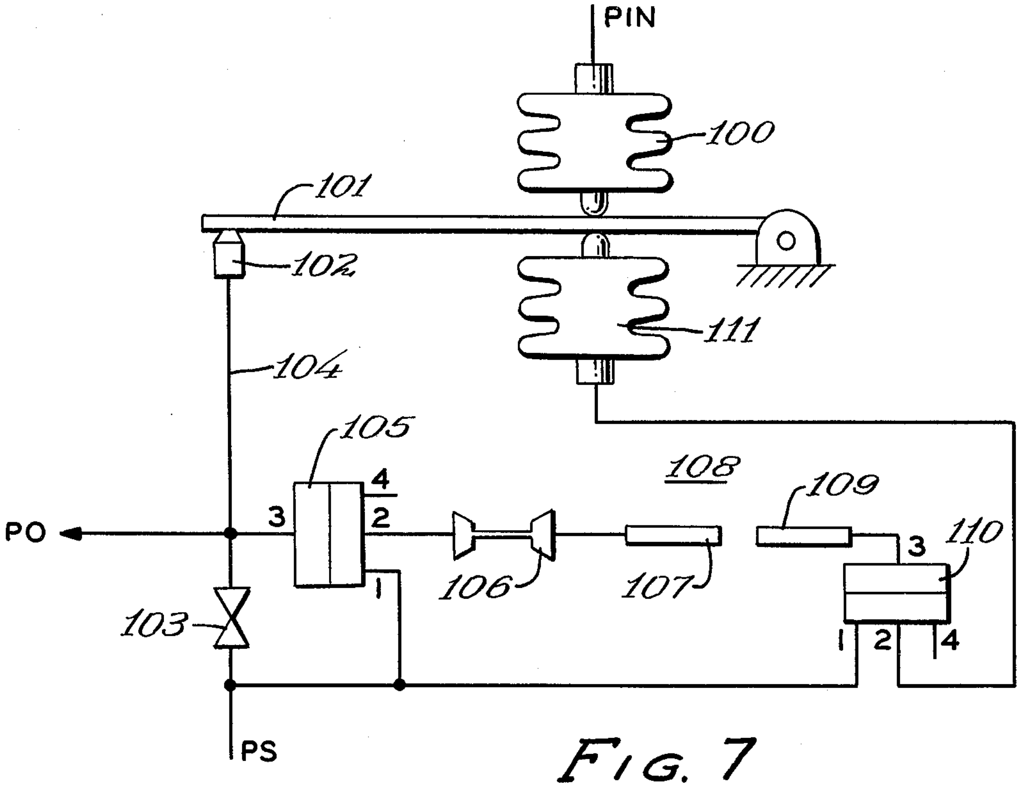
FIG. 7 is a schematic diagram of yet another form of a square root extractor for use with two inputs; and, FIG. 8 is a schematic diagram of still another form of the invention.

In FIG. 7, the squaring device shown in the previous embodiments of the invention are replaced by a jet pipe squaring device as shown. The jet pipe arrangement is more fully disclosed in copending application Ser. No. 770,471 filed Feb. 22, 1977. As previously described, pressure Pin operates within bellows 100 to apply a force against force transmitter or lever 101 which cooperates with nozzle 102, main supply Ps and restriction 103 for developing a pressure in line 104 dependent upon the pressure Pin. The pressure in line 104 is connected to the control port of a capacity amplifier 105 which may be the Honeywell Capacity Amplifier RP970. Amplifier 105 has a main port connected to the supply Ps and a branch output connected through a linear restrictor 106 the output of which is connected to the primary nozzle 107 of the jet pipe arrangement 108. Primary nozzle 107 will then supply a jet of fluid having a velocity dependent upon or proportional to the pressure in line 104. The secondary nozzle 109 will pick up a portion of the fluid supplied by jet 107 dependent upon the velocity pressure in line 104. As is well known, velocity pressure is proportional to the square of the velocity of the air which it is sensing. Thus, since nozzle 107 is supplying a jet of air proportional to the pressure of the air in line 104 and since secondary nozzle 109 is receiving the velocity pressure of the air issuing from nozzle 107 which is proportional to the square of the velocity of the air issuing from nozzle 107, the pressure in nozzle 109 is proportional to the square of the pressure within line 104. Thus, capacity amplifier 110 which may be similar to amplifier 105 amplifies the signal and provides it to the feedback bellows or motor 111 to apply a force against lever 101 opposite to the force applied to that lever by bellows 100. As noted above, therefore, the output pressures P0 will thus be linearly related to the input pressure Pin when that input signal is a square function.

Certain modifications can be made to the circuit of FIG. 7 without departing from the scope of the invention. For example, linear restriction 106 can be eliminated by elongating primary nozzle 107 and reducing its inside diameter. Moreover, by enlarging bellows 111, amplifier 110 may be eliminated.

Figure 6:
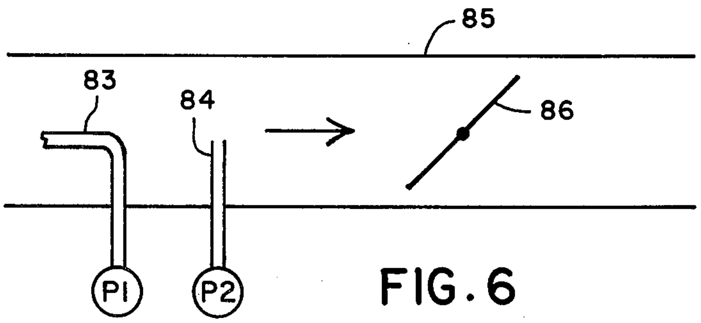
FIG. 6 shows the input sources of FIG. 5.
Figure 8:
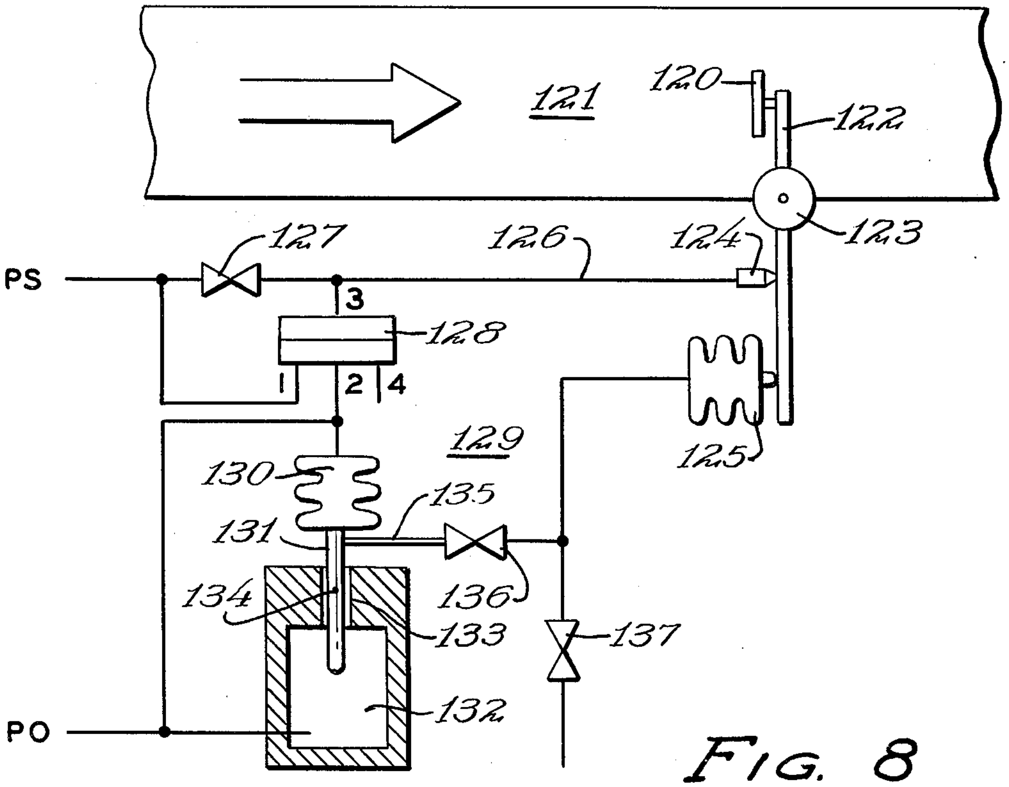

FIGS. 5 and 6 show one way in which the input pressure to the inventon may be derived. The apparatus shown in FIG. 8 shows an alternative way of providing the input pressure to the square root extractor. Target 120 is inserted into duct 121 and responds to the velocity pressure of the air moving through that duct. Since velocity is the variable which is desired to be controlled, and since the velocity of the air moving through duct 121 is proportional to the square root of the velocity pressure of that air, it is necessary to extract the square root of the velocity pressure sensed by target 120. Thus, target 120 is attached to lever 122 having a viscous damper and pivot point 123 for allowing lever 122 to rotate with respect to both nozzle 124 and bellows 125. Bellows 125 is the feedback pressure and the pressure acting against target 120 is the input pressure. The pressure in line 126 will therefore be related to the velocity pressure of the air moving through duct 121. Line 126 which is connected to nozzle 124 at one end is also connected to main pressure Ps through restriction 127. Line 126 is connected to the control input of capacity amplifier 128 which also has a main input connected to main source Ps and a branch output connected to one input of squaring device 129. Squaring device 129 takes the form of the device shown in FIG. 2 with two modifications. First, instead of the damper motor 70 for moving tube 74, a bellows 130 is utilized to move tube 131. Thus, branch pressure from capacity amplifier 128 is supplied to bellows 130 and is also supplied to output P0. The output pressure P0 is connected to chamber 132 which establishes a pressure gradient along restrictive passage 133 from the pressure within 132 to the two atmosphere at the other end of passage 133. Orifice 134 in tube 131 picks off the pressure along the gradient established between tube 131 and restrictive passage 133 for supply to output 135. Since the output pressure P0 is connected to both sides of squaring device 129, the output in tube 135 is the square of the output pressure. Restrictions 136 and 137 form a pressure attenuator the junction of which is connected to feedback bellows 125 such that the output pressure P0 is a function of the square root of the velocity pressure for the air moving through duct 121.

The embodiments of the invention in which an exclusive property or right is claimed are defined as follows:

1. A fluidic square root extractor comprising:
first input terminal means for connection to a source of main pressure;
output terminal means for supplying an output pressure;
second input terminal means for receiving an input pressure the square root of which is to be extracted;
first connecting means for connecting said first input terminal means to said output terminal means;
amplifier means connected to said first connecting means and to said second input terminal means for generating said output pressure as a function of said input pressure, said amplifier means having a feedback means;
squaring means connected to said first connecting means for providing a feedback pressure as a function of the square of said output pressure; and,
second connecting means connected to said squaring means and said feedback means for supplying said feedback pressure to said feedback means,
whereby said output pressure is a function of the square root of said input pressure.

2. The extractor of claim 1 wherein said amplifier means comprises a variable gain amplifier.

3. The extractor of claim 1 wherein said amplifier means comprises force transmitting means, first motor means connected to said second input terminal means for applying a force to said force transmitting means in response to said input pressure, second motor means, as said feedback means, connected to said squaring means by said second connecting means for applying a force to said force transmitting means in response to said feedback pressure, and first nozzle means connected to said first connecting means for cooperating with said force transmitting means.

4. The extractor of claim 3 wherein said first and second motor means are arranged to apply their forces to opposite sides of said force transmitting means.

5. The extractor of claim 3 wherein said squaring means comprises third motor means connected to said first connecting means, second nozzle means cooperating with said third motor means and means connecting said second nozzle means to said first connecting means and to said second motor means.

6. The extractor of claim 5 wherein said first, second and third motor means comprise respective first, second and third bellows and said force transmitting means comprises a lever.

7. The extractor of claim 6 wherein said first and second bellows are arranged to apply their forces to opposite sides of said lever.

8. The extractor of claim 5 wherein said force transmitting means comprises a lever, wherein said first motor means comprises a first diaphragm module having a first control chamber connected to said second input terminal means and a first diaphragm movable by said input pressure within said first control chamber to apply a force to said lever, and wherein said second motor means comprises a second diaphragm module having a second control chamber connected to said second connecting means and a second diaphragm movable by said feedback pressure within said second control chamber to apply a force to said lever.

9. The extractor of claim 8 wherein said third motor means comprises a third diaphragm module having a third control chamber connected to said first connecting means, a diaphragm movable in response to said output pressure within said third control chamber, a force transmitting means movable in response to said third diaphragm and wherein said second nozzle means cooperates with said force transmitting means of said third motor means.

10. The extractor of claim 9 wherein said first and second diaphragms are arranged to apply their forces to opposite sides of said lever.

11. A fluidic square root extractor comprising:
first input terminal means for connection to a source of main pressure;
output terminal means for supplying an output pressure;
second input terminal means for receiving an input pressure the square root of which is to be extracted;
amplifier means connected to said first and second input terminal means and said output terminal means for providing an output pressure as a function of said input pressure and having feedback means; and,
squaring means connected to said output terminal means for providing a feedback pressure which is a function of the square of said output pressure, said squaring means being connected to said feedback means,
whereby said output pressure is a function of the square root of said input pressure.

12. The extractor of claim 11 wherein said amplifier means comprises a variable gain amplifier.

13. The extractor of claim 11 wherein said amplifier comprises a force transmitting means, first motor means connected to said second input terminal means for applying a force to said force transmitting means in response to said input pressure, second motor means, as said feedback means, connected to said squaring means for applying a force to said force transmitting means in response to said feedback pressure, and first nozzle means connected to said first input terminal means and to said output terminal means for cooperating with said force transmitting means.

14. The extractor of claim 13 wherein said first and second motor means are arranged to apply their forces to opposite sides of said force transmitting means.

15. The extractor of claim 13 wherein said squaring means comprises third motor means connected to said output terminal means, second nozzle means cooperating with said third motor means and means connecting said second nozzle means to said first nozzle means and to said feedback means.

16. The extractor of claim 15 wherein said first, second and third motor means comprise respective first, second and third bellows and said force transmitting means comprises a lever.

17. The extractor of claim 16 wherein said first and second bellows are arranged to apply their forces to opposite sides of said lever.

18. The extractor of claim 15 wherein said force transmitting means comprises a lever, wherein said first motor means comprises a first diaphragm module having a first control chamber connected to said second input terminal means and a first diaphragm movable by said input pressure within said first control chamber to apply a force to said lever, and wherein said second motor means comprises a second diaphragm module having a second control chamber connected to said second nozzle means and a second diaphragm movable by said feedback pressure within said second control chamber to apply a force to said lever.

19. The extractor of claim 18 wherein said third motor means comprises a third diaphragm module having a third control chamber connected to said output terminal means, a diaphragm movable in response to said output pressure within said third control chamber, a force transmitting means movable in response to said third diaphragm and wherein said second nozzle means cooperates with said force transmitting means of said third motor means.

20. The extractor of claim 19 wherein said first and second diaphragm modules are arranged to apply their forces to opposite sides of said lever.

21. The extractor of claim 1 wherein said squaring means comprises a jet tube arrangement having primary tube means connected to said first connecting means for issuing a jet of fluid dependent upon the output pressure and secondary tube means connected to said feedback means by said second connecting means for receiving a portion of said fluid dependent upon the velocity pressure of said fluid.

22. The extractor of claim 3 wherein said squaring means comprises a jet tube arrangement having primary tube means comprises a jet tube arrangement having primary tube a jet of fluid dependent upon the output pressure and secondary tube means connected to said feedback means by said second connecting means for receiving a portion of said fluid dependent upon the velocity pressure of said fluid.

23. The extractor of claim 11 wherein said squaring means comprises a jet tube arrangement having primary tube means connected to said output terminal means for issuing a jet of fluid dependent upon said output pressure and secondary tube means for receiving a portion of said fluid dependent upon said velocity pressure of said fluid and connected to said feedback means.

24. The extractor of claim 13 wherein said squaring means comprises a jet tube arrangement having primary tube means connected to said output terminal means for issuing a jet of fluid dependent upon said output pressure and secondary tube means for receiving a portion of said fluid dependent upon said velocity pressure of said fluid and connected to said feedback means.

25. A fluidic square root extractor comprising:

first input means for connection to a source of main pressure;

output terminal means for supplying an output pressure;

second input means for receiving an input the square root of which is to be extracted;

amplifier means connected to said first and second input means and said output terminal means for providing an output pressure as a function of said input and having feedback means; and, squaring means connected to said output terminal means for providing a feedback pressure which is the function of the square of said output pressure, said squaring means being connected to said feedback means, whereby said output pressure is a function of the square root of said input.

26. The extractor of claim 25 wherein said second input means comprises a means for providing a mechanical input.

27. The extractor of claim 26 wherein said amplifier means comprises a lever upon which said input and said feedback pressure operate.

28. The extractor of claim 27 wherein said amplifier means comprises a nozzle for cooperating with said lever and means connecting said first input means to said nozzle and to said output terminal means.

29. The extractor of claim 28 wherein said second input means comprises a target for sensing the velocity pressure of air moving over said target and connected to said lever.

30. The extractor of claim 28 wherein said squaring means comprises a jet tube arrangement having primary tube means connected to said output terminal means for issuing a jet of fluid dependent upon said output pressure and secondary tube means for receiving a portion of said fluid dependent upon said velocity pressure of said fluid and connected to said feedback means.

31. The extractor of claim 25 wherein said squaring means comprises a jet tube arrangement having primary tube means connected to said output terminal means for issuing a jet of fluid dependent upon said output pressure and secondary tube means for receiving a portion of said fluid dependent upon said velocity pressure of said fluid and connected to said feedback means.

* * * * *

UNITED STATES PATENT OFFICE
CERTIFICATE OF CORRECTION

PATENT NO. : 4,201,336
DATED : May 6, 1980
INVENTOR(S) : Richard C. Mott

It is certified that error appears in the above-identified patent and that said Letters Patent are hereby corrected as shown below:

In claim 22, line 62, delete "comprises a jet tube arrangement having" and insert --connected to said first connecting means--. In line 63 delete "primary tube" and insert --for issuing--.

Signed and Sealed this

*Nineteenth* Day of *August 1980*

[SEAL]

*Attest:*

SIDNEY A. DIAMOND

*Attesting Officer* *Commissioner of Patents and Trademarks*